Aug. 13, 1946.  C. F. CRUMB  2,405,688
TYER
Filed April 23, 1943  8 Sheets-Sheet 1

Inventor:
Charles F. Crumb,
By Paul O. Pippel
Attorney.

Aug. 13, 1946.  C. F. CRUMB  2,405,688
TYER
Filed April 23, 1943   8 Sheets-Sheet 3

Inventor:
Charles F. Crumb,
By Paul O. Pippel
Attorney.

Aug. 13, 1946.  C. F. CRUMB  2,405,688
TYER
Filed April 23, 1943    8 Sheets-Sheet 5

Inventor:
Charles F. Crumb,
By Paul O. Pippel
Attorney.

Aug. 13, 1946.  C. F. CRUMB  2,405,688
TYER
Filed April 23, 1943   8 Sheets-Sheet 6

Inventor:
Charles F. Crumb,
By Paul O. Pippel
Attorney.

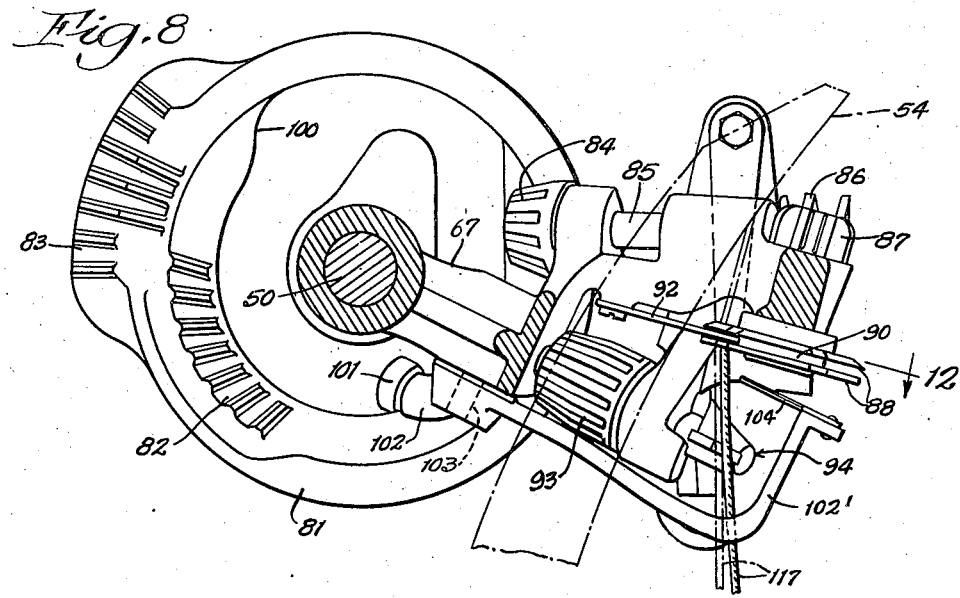
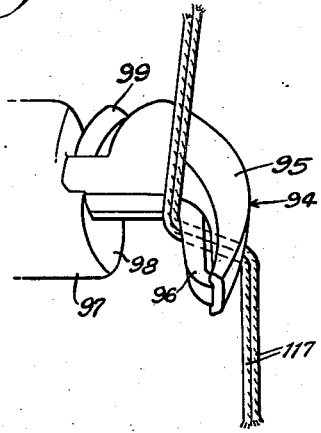
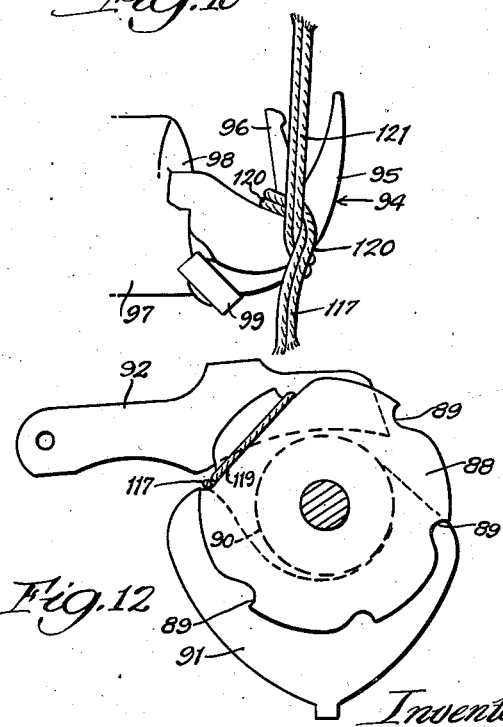
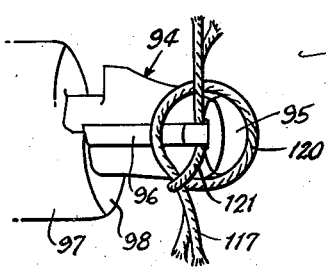

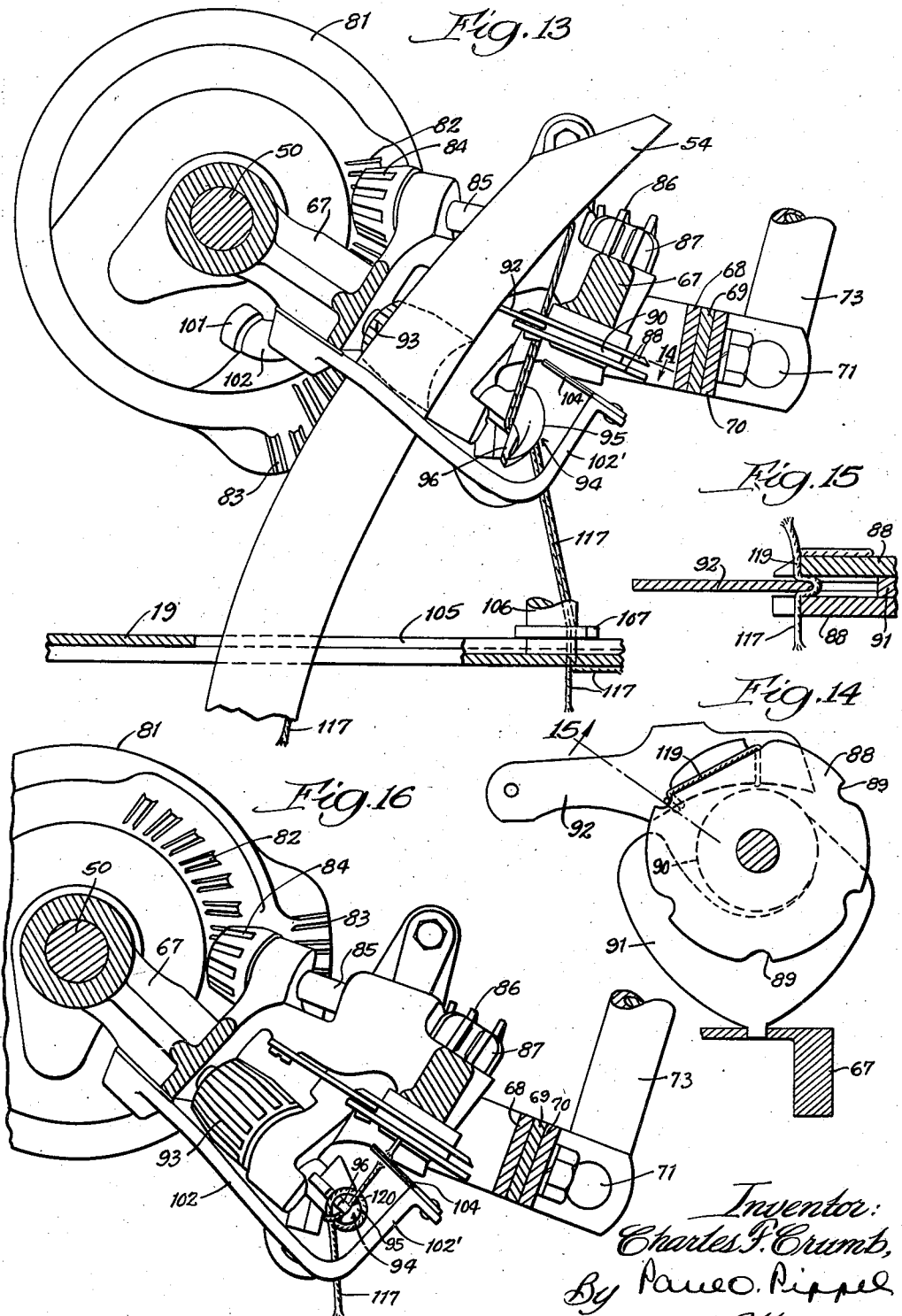

Patented Aug. 13, 1946

2,405,688

UNITED STATES PATENT OFFICE 2,405,688

TIER

Charles F. Crumb, Clarendon Hills, Ill., assignor to International Harvester Company, a corporation of New Jersey Application April 23, 1943, Serial No. 484,275

18 Claims. (Cl. 100—20)

This invention relates to a tier. More specifically it relates to a tier for a baler.

Many tiers have been developed for operation both with a traveling pick-up baler and with a stationary baler. Some difficulties have arisen probably because the bales formed are relatively large and unyielding, and the knots formed have not been entirely satisfactory. On the other hand, tiers associated with grain binders have been satisfactory because the bundles are small and yielding. The present application has to do with adapting a tier of the type heretofore used with a grain binder for use with a hay baler.

An object of the present invention is to provide an improved tier.

A further object is the provision of an improved tier for a baler.

Another object is to improve a tier of the type which ties by forming a bight in a strand and introducing a part of the strand into the bight.

A still further object is to adapt this type of tier to a baler.

According to the present invention, a tier is mounted on top of a baler chamber of a baler, which has a conveyer for feeding material to be baled through a feed opening in a vertical side of the baling chamber. A baling strand extends around a bale along the top and bottom and between the top and bottom of the baling chamber and has its ends presented to the tier. The tier is so constructed that as the tying operation proceeds the tier moves downwardly toward the bale chamber to provide slack in the baling strand or the amount of strand necessary to produce a tie without a pulling up of the strand around the bale.

In the drawings:

Figure 8 is a vertical sectional view taken along the line 8—8 of Figure 4;

Figures 9, 10, and 11 are enlarged perspective views of the bill-hook forming part of the tier in three different positions;

Figure 12 is a sectional view taken along the line 12 of Figure 8;

Figure 13 is a sectional view similar to Figure 8 but with the parts in a different position;

Figure 14 is a sectional view taken along the line 14 of Figure 13;

Figure 15 is a sectional view taken along the line 15 of Figure 14; and

Figure 16 is a sectional view similar to Figures 8 and 13 but with the parts in a still different position.

Figure 1:
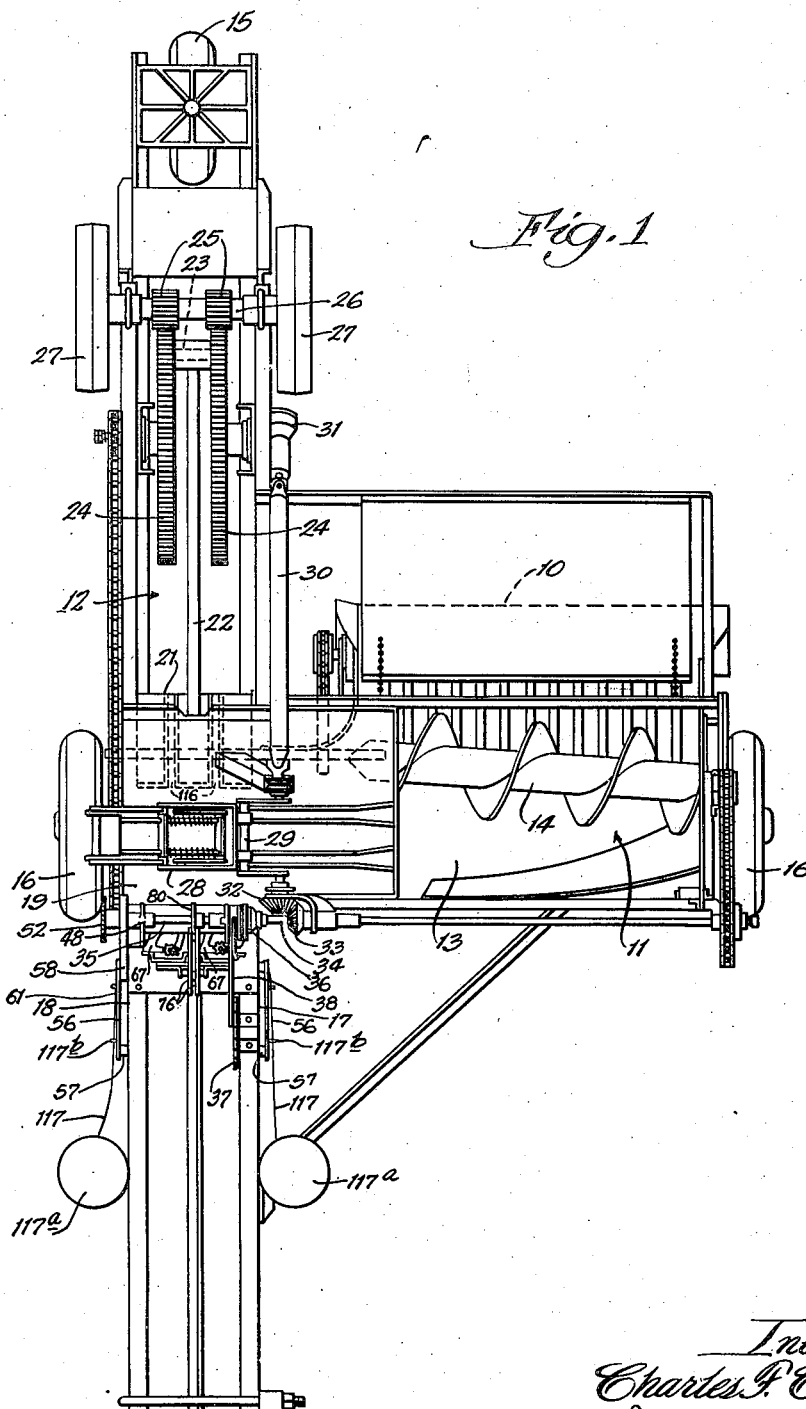
Figure 1 is a plan view of a traveling pick-up baler to which the improved tier of the present invention is applied.

Figure 1 shows in plan a pick-up baler to which the novel tying mechanism of the present invention is applied. This pick-up baler comprises essentially a pick-up device 10, a conveying means 11, and a baling unit 12 to which the conveying means 11 transfers material to be baled from the pick-up device 10. The conveying means 11 comprises essentially a platform 13 and an open-ended auger 14. The pick-up baler is mounted upon a front truck 15 and wheels 16. The auger 14 moves material to be baled over the platform 13 through a feed opening 16a in a vertical side 17 of a baling chamber. The baling chamber has another vertical side 18, a top 19, and a bottom 20. A baling plunger 21 reciprocates within the baling chamber and is driven by a pitman 22, which is connected by a crank pin 23 secured to and extending between two large gears 24 driven by pinions 25 on a shaft 26. Secured to the ends of the shaft 26 are belt pulleys 27, which may with the aid of belts, not shown, drive the shaft 26 and through the various parts described cause reciprocation of the baling plunger 21 in the baling chamber. There is also provided a mechanism 28, which includes packer fingers, not shown, that carry material from adjacent the open end of the auger 14 upon the platform 13 through the feed opening into the baling chamber. This mechanism 28 is driven by a crank structure 29, in turn driven by a shaft 30 connected through a gear box 31 with one large gear 24. The various features just described are shown more fully and are claimed in the copending application of Crumb et al., Serial No. 466,460, filed November 21, 1942.

Figure 3:
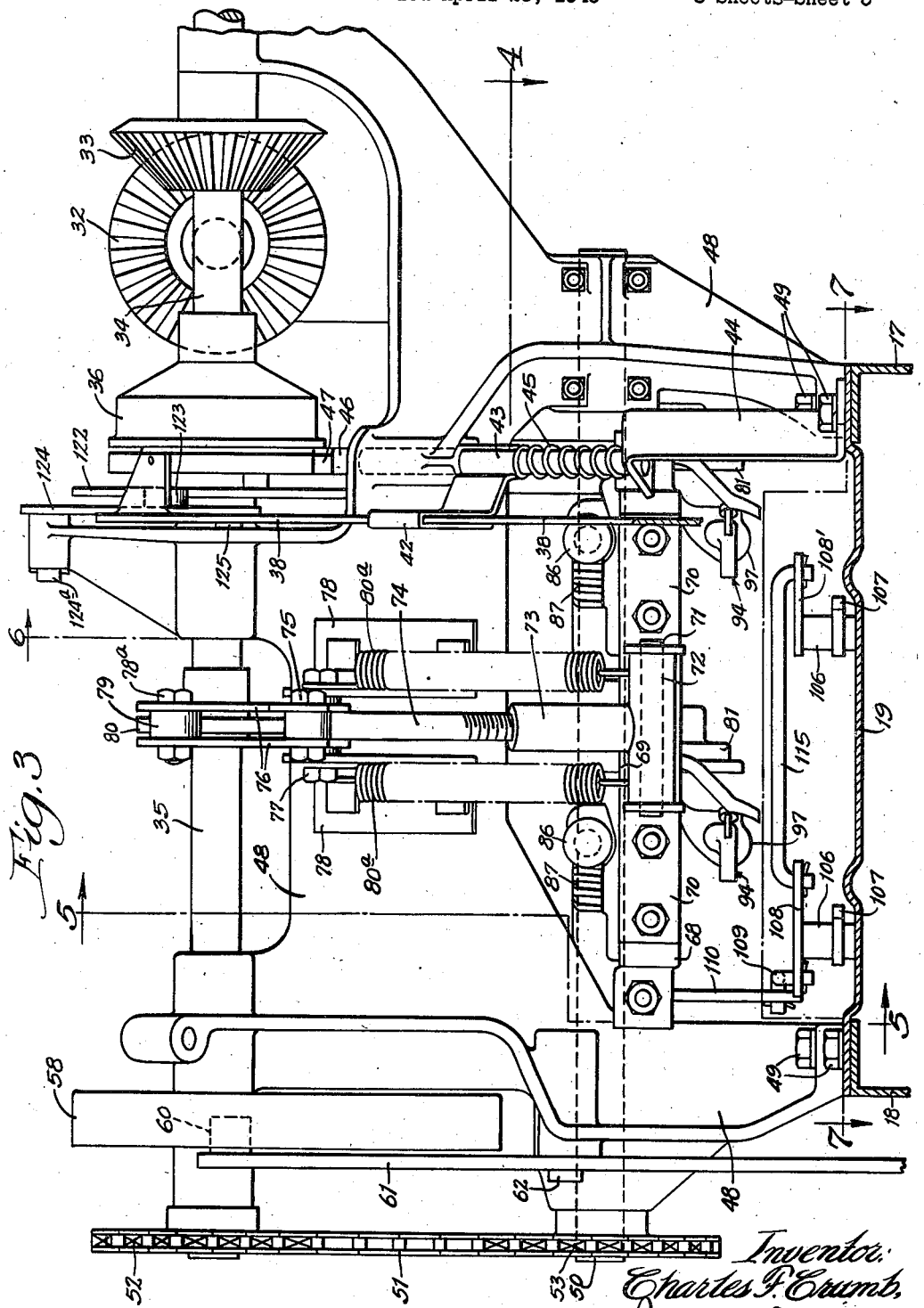
Figure 3 is a vertical sectional view taken along the line 3—3 of Figure 2 and showing the novel tier of the present invention.
Figure 6:
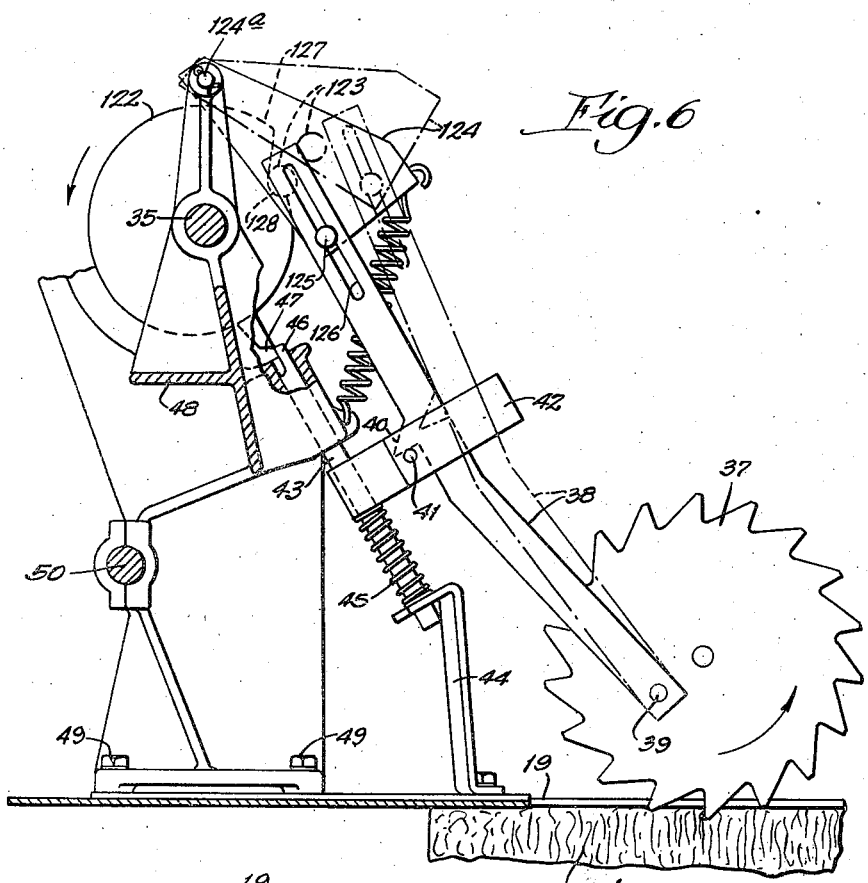
Figure 6 is a vertical sectional view taken along the line 6 of Figure 3.

Driven by the shaft 30 through the crank structure 29 is a bevel gear 32, which in turn drives a bevel gear 33 secured upon a shaft 34 which is driven by the gear 33. As shown in Figure 3, a shaft 35 is in axial alinement with the shaft 34 and is connected thereto by a clutch 36 which is held normally disengaged. The clutch is not shown in detail, since it forms no part of the present invention. It is caused to engage by a toothed wheel 37 shown in Figure 6. As seen in this figure, the wheel 37 extends through the top 19 of the baling chamber into engagement with a mass of material 37' within the baling chamber. As material is fed into the baling chamber and is moved to the right as viewed in Figure 6, the toothed wheel 37 rotates slowly. A link 38 is pivotally connected at 39 to the toothed wheel 37 and carries a projection 40, which engages a pin 41 secured to a strap 42 secured to a rod 43. The rod 43 is slidably mounted in a bracket 44, and a spring 45 mounted upon the rod 43 resists downward sliding of the rod 43. The rod 43 has an end portion 46, which, as shown in Figure 6, is in engagement with the part 47. The toothed wheel 37 rotates in a counter-clockwise direction, as indicated by the arrow, and when it is moved just a little beyond the position of Figure 6, it acts through the projection 40 on the link 38 and the pin 41 on the strap 42 to pull the rod 43 down sufficiently against the yielding action of the spring 45 to cause a disengagement of the end portion 46 from the part 47. This disengagement conditions the clutch 36 so that when the shaft 34 has reached a predetermined angular position, the clutch 36 is engaged so that the shaft 34 begins to drive the shaft 35. At this point, the rotation of the shaft 35 puts into operation the various parts of the tying mechanism which are to be described presently. The various parts described with reference to Figure 6 are so arranged that when a sufficient mass of material 37″ has accumulated in the baling chamber, the toothed wheel 37 has reached a position just beyond that of Figure 6 so that the rod 43 is disengaged from the part 47 and the clutch 36 is conditioned so that upon the subsequent arrival of the shaft 34 at a predetermined position, the clutch 36 is engaged. The clutch 36 is not engaged until the arrival of the shaft 34 at a predetermined position, because the baling plunger 21 must be at the proper position when the various parts of the tying mechanism commence to operate. The various parts of the tying mechanism must be properly timed with respect to the plunger 21 so that when needles to be described presently carrying baling strands carry these strands across the baling chamber, they may do so through slots in the plunger. The various parts just described have not been shown in greater detail, since no invention is claimed in the commencement of operation of the tying mechanism automatically upon sufficient accumulation of material in the baling chamber.

The shaft 35 is rotatably carried by a supporting means in the form of a large casting 48 secured, as indicated at 49, to the top 19 of the baling chamber. A shaft 50 is also rotatably mounted in the casting 48 and is driven by the shaft 35 through a sprocket chain 51 and sprockets 52 and 53 secured respectively to the shafts 35 and 50.

Figure 2:
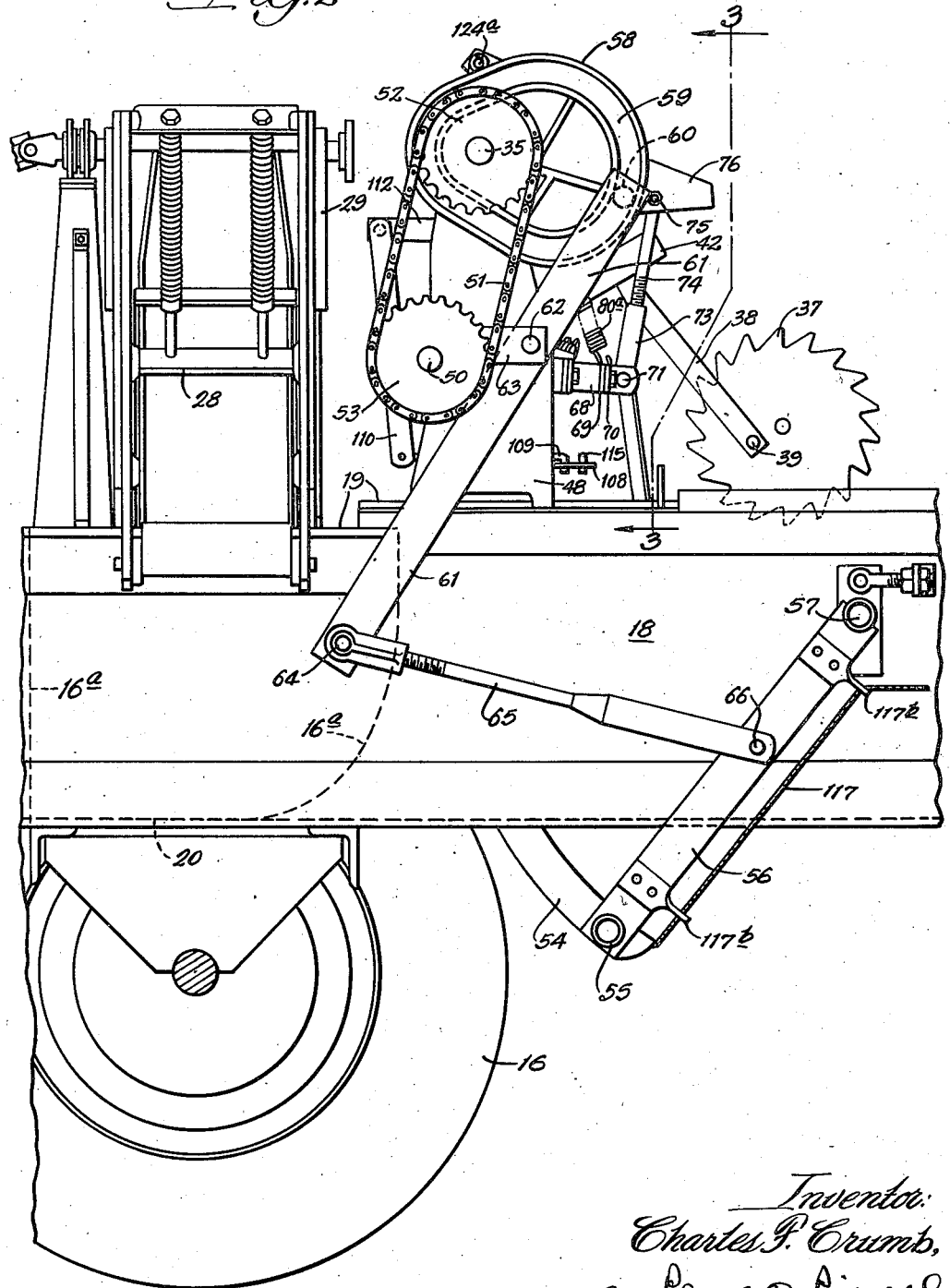
Figure 2 is a side view of a portion of the assembly shown in Figure 1.

As shown in Figures 1 and 2, a pair of needles 54, only one being shown, is secured to a pipe 55 which in turn is secured to arms 56 pivoted at 57 on the sides 17 and 18 of the baling chamber. The position of the needles 54 is controlled by a cam 58 secured upon the shaft 35. The cam 58 has a track 59 in which is a follower 60 secured to a lever 61 pivoted at 62 upon a member 63 secured to the casting 48. The lever 61 is connected at 64 with an adjustable link 65 pivotally connected at 66 with the arm 56.

Figure 4:
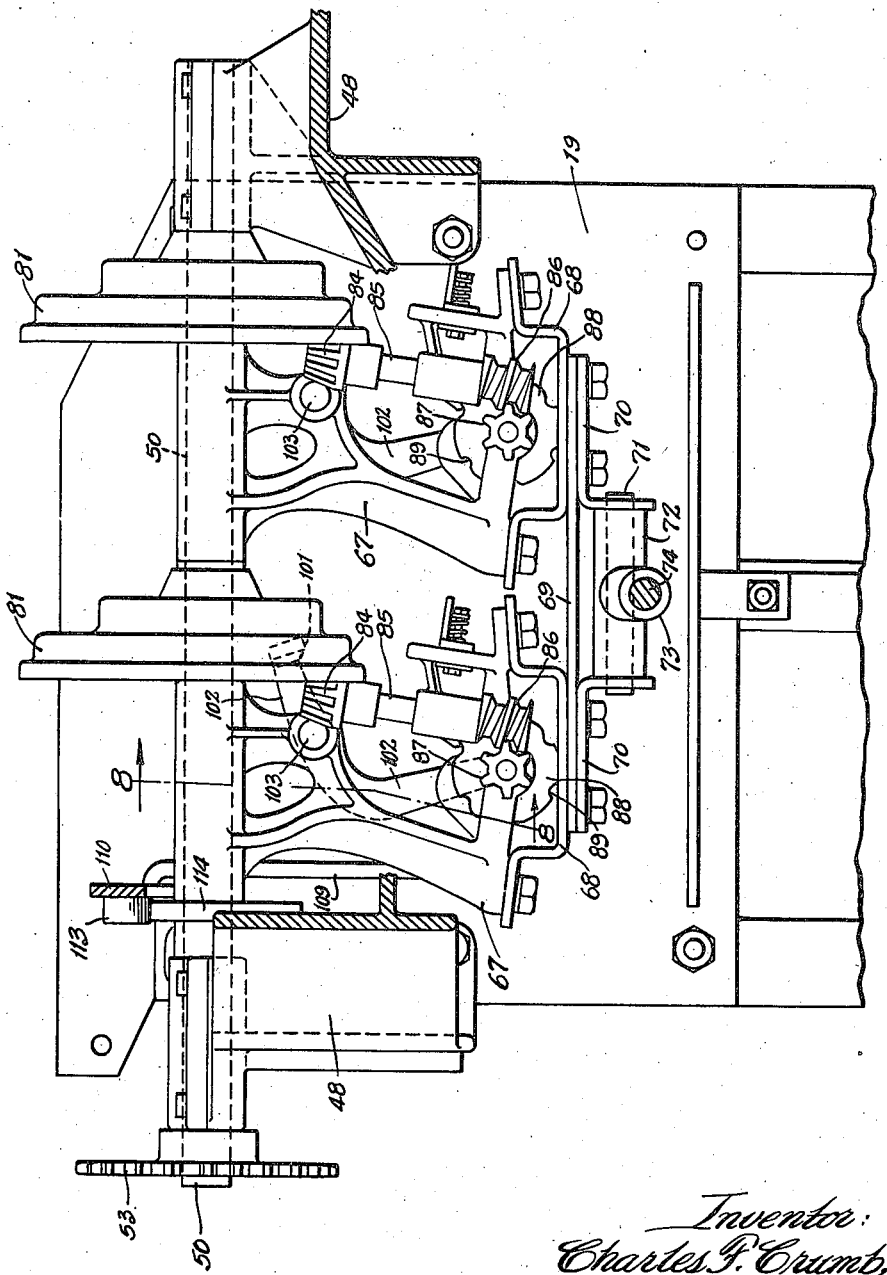
Figure 4 is a horizontal sectional view taken along the line 4 of Figure 3.
Figure 5:
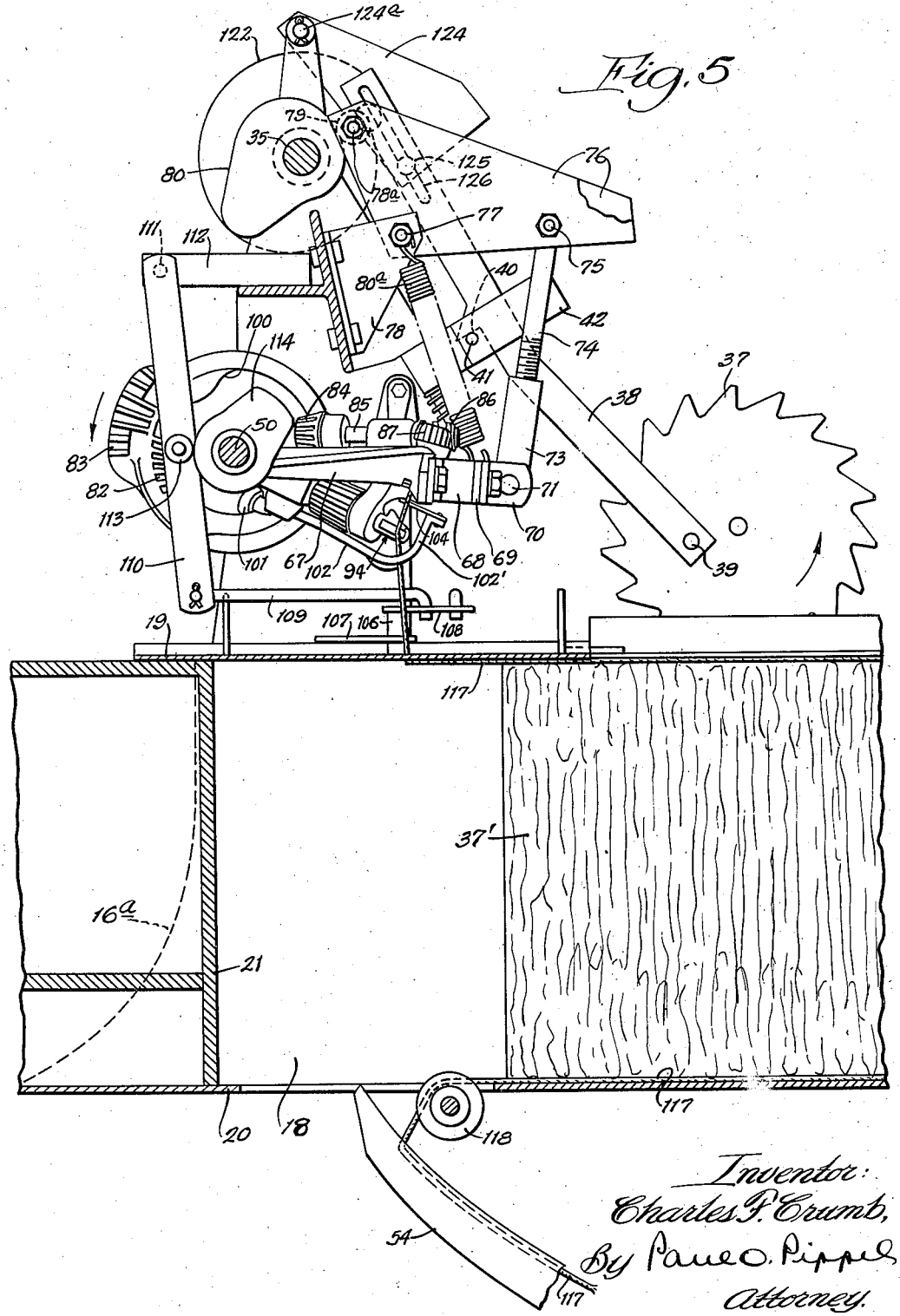
Figure 5 is a vertical sectional view taken along the line 5—5 of Figure 3.

As shown in Figures 4, 8, 13, and 16, there is pivotally mounted upon the shaft 50 a pair of knotter frames 67. To each knotter frame 67 is secured a U-shaped piece 68, and these pieces are interconnected by a strap 69. L-shaped brackets 70 are secured to the strap 69 on the U-shaped pieces 68, and carried between them is a pin 71 upon which is pivoted a sleeve member 72 having a transverse tubular portion 73, which receives adjustably a threaded rod 74 pivotally connected at 75 between a pair of pieces 76. The pieces 76 are pivotally supported by a bolt 77 on two brackets 78 secured to the casting 48. The pieces 76 carry between them on a bolt 78ª a follower 79, which engages a cam 80 secured upon the shaft 35. The cam 80 acting through the pieces 76 and the rod 74 determines the angular position of the casting 67 about the shaft 50. As shown in Figures 3 and 5, springs 80ª, connected at their ends to the bolt 77 and the strap 69, exert an upward pull on the castings 67 and keep the follower 79 in contact with the cam 80. A comparison of Figures 8, 13, and 16 will show the position of the castings 67 in one figure to be different from those of the other figures.

Secured to the shaft 50 is a pair of members 81, each having a toothed segment 82 and a toothed segment 83. When each member 81 reaches the proper angular position, the toothed segment 82 engages a bevel gear 84 secured to a shaft 85 journaled in the knotter frame 67. As seen in Figure 4, the shaft 85 has a worm 86 at one end engaging and driving a worm wheel 87 to which is connected by a shaft section, not shown, a pair of spaced plates 88 having peripheral notches 89. Rotation of the member 81 upon engagement of the toothed segment 82 with the bevel gear 84 causes an angular movement of the notched plates 88. As seen in Figures 8 and 12, a plate 90 of considerably smaller diameter than the notched plates 88 is positioned between them and holds them in spaced relation. A generally U-shaped member 91 extends into the space between the plates 88 and substantially embraces one-half of the periphery of the plate 90. As seen in Figure 15, the U-shaped member 91 is as thick as the width of the spacing between the notched plates 88. The member 91 is a conventional stripper member performing only the function of removing the severed portions of strand from between the plates 88. Said member 91 is provided with a lug extension as shown in Figure 14 to hold it against rotation with respect to the knotter frame. At the other side is positioned a member 92 of lesser thickness (see Figure 15) which extends into the space between the notched plates 88. Said member is pivoted to the knotter frame as shown in Figure 16.

When the member 81 has rotated sufficiently, the toothed section 83 engages a pinion 93 to which a bill-hook 94 is secured by a stub shaft not shown. The bill-hook 94 comprises a fixed part 95, which is directly secured to the stub shaft not shown and a part 96 pivotally mounted in the part 95 so as to be movable with respect thereto. The bill-hook 94 rotates in a portion 97 of the knotter frame 67, which has a cam surface 98 engaging a follower 99 on the movable part 96 of the bill-hook 94. It will be seen from a comparison of Figures 9, 10, and 11 that as the bill-hook rotates, the parts 95 and 96 are first closed as shown in Figure 9, then are opened as shown in Figure 10, and then are closed as shown in Figure 11. This is due to the riding of the follower 99 upon the cam 98.

The rotating member 81 has a cam track 100 engaged by a follower 101 on one end of an L-shaped member 102 pivoted at 103 in the knotter frame, as shown in Figures 4 and 8. The other end of the L-shaped member 102 has an upstanding portion 102′, which carries a knife 104. As the member 81 rotates, and the follower 101 moves out from the shaft 50 because of the increase in the spacing of the cam track 100 from the shaft 50, the knife 104 moves outwardly toward the observer in Figures 8, 13, and 16.

Figure 7:
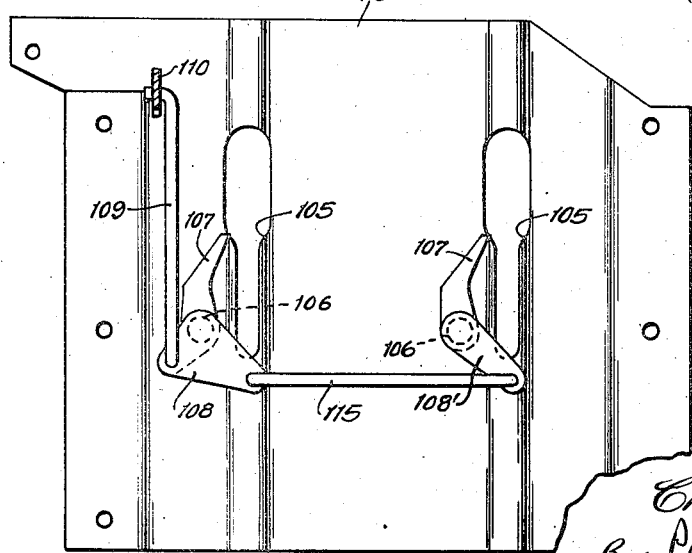
Figure 7 is a horizontal sectional view taken along the line 7—7 of Figure 3.

Figure 7 shows a portion of the top 19 of the baling chamber. Formed in this portion is a pair of slots or openings 105 through which the needles 54 extend in their uppermost positions. This is shown in Figure 13. Secured to members 106 are tuckers 107 which pivot at a pivotal mounting of the members 106 in the top 19 of the baling chamber. Secured to the one tucker 107 by the one piece 106 is a triangular member 108 to which is connected a rod 109 connected in turn to the lower end of a link 110, as shown in Figures 5 and 7. The upper end of the link 110 is pivotally connected at 111 to a member 112 secured to the casting 48. A follower 113 engages a cam 114 upon the shaft 50. The other tucker 107 is connected through the other member 106 to a part 108' which is connected by a link 115 with the triangular part 108. Thus the tuckers 107 pivot conjointly. As the cam 114 rotates with the shaft 50, the lower end of the link 110 moves back and forth and the tuckers move back and forth across the openings 105.

In operation, material to be baled is fed through the feed opening in the vertical side 17 of the baling chamber, and the plunger 21 moves back and forth compressing the material to a mass, as shown at 37'. When sufficient material has accumulated for a bale, the toothed wheel 37 will have reached a position which will have caused the rod 43 to be pulled downwardly sufficiently for disengagement of the end portion 46 from the part 47. When this has taken place, the clutch 36 will be so conditioned that upon arrival of the shaft 34 at a predetermiend angular position, the clutch 36 will become engaged so as to transmit the rotation of the shaft 34 to the shaft 35. The beginning of rotation of the shaft 35 starts the operation of the tying mechanism. The predetermined angular position of the shaft 34 at which the operation of the tying mechanism starts is determined by the extreme right-hand position of the baling plunger 21 of Figure 5. The baling plunger 21 has slots 116 through which the needles 54 are projected out of contact with the mass of material 37' being baled. As seen in Figures 1, 2, and 5, a pair of baling strands 117 extends from balls or other accumulations thereof in containers 117ª through guides 117ᵇ on arms 56, and along and within needles 54. As shown for one needle 54 in Figure 5, the strand 117 extends from the needle near the end thereof over a roller 118 at the bottom 20 of the baling chamber, then longitudinally of the baling chamber along the bottom 20, then vertically upwardly across the baling chamber to the top 19, then along the under side of the top of the baling chamber, then upwardly out of the baling chamber through one slot 105 in the top of the baling chamber. As shown in Figure 12, the baling strand 117 terminates in an end portion 119 extending into a notch 89 in the plates 88 across the top plate 88 and into another notch 89 in the top plate 88 and between the top plate and the member 92 as to be held therebetween. The initial anchoring of the strand between the plates 88 is effected by the operator when the machine is threaded by the operator. When the shaft 35 starts to rotate, the cam 53 rotates with it and causes the needles 54 to be moved from the position shown in Figure 5 upwardly through the slots 116 in the baling plunger 21 and the slots 105 in the top 19 of the baling chamber to the elevated position of Figure 13. The baling strand 117 will have been introduced into one of the same sets of notches 89 in the plates 88 as the held end 119 of the strand is positioned. This is shown in Figure 12. While the needles 54 have been moving to their elevated position, the member 81 has rotated to bring the toothed segments 82 and 83 from the position of Figure 8 to that of Figure 13. Upon contact of the toothed segment 82 with the bevel gear 84, the gear 84 rotates and causes angular movement of the notched plates 88. Thus they move from the position of Figure 12 to that of Figure 14, which shows the end portion 119 and the other part of the strand 117 introduced by the needle 54 to be clamped by the plates 88 and the member 92, as shown in Figure 15. Then the toothed segment 83 engages the pinion 93 causing it and the bill-hook 94 to rotate. The cam 114 will, in the meantime, have moved the tuckers 107 across the slots 105 in the top 19 of the baling chamber so as to cause the portion of the baling strand below the bill-hook 94 to be offset from a portion above the bill-hook, as shown in Figures 9 and 13. Thus the continued rotation of the bill-hook from the position of Figure 9 to that of Figure 10 causes the formation of a bight 120 about the bill-hook 94. Through this movement, the cam 98 acting on the follower 99 on the movable part of the bill-hook 94 will have caused the parts of the bill-hook to have spread to receive between them a portion 121 of the baling strand 117 so that this portion 121 may be retained in the baling hook, as shown in Figure 11. Then the cam track 100 in the member 81 will have reached such a position as to cause the knife 104 to swing forwardly toward the observer to the position of Figure 16, in which the knife 104 engages the baling strand so as to sever it, the cutting force being applied in a direction acting to pull the bight 120 off the bill-hook 94. The portion 121 retained between the members 95 and 96 of the bill-hook 94 will be pulled through the bight 120 so that a tie is formed. As the knife 104 severs the strand and as the bight 120 is moved off the hook 94, the knotter frame 67 and the tying mechanism carried thereby are moving upwardly after having reached a lowermost position.

A significant and novel feature of the present application is that during the rotation of the bill-hook 94 to form the bight 120, the various parts mounted upon the knotter frame 67 will have moved downwardly toward the baling chamber, as will be evident from a comparison of Figures 8, 13, and 16, which show progressively the various positions assumed during formation of a knot which will be referred to as a knot tying operation. The knotter frames 67 are moved downwardly, because the cam 80 rotates and thus causes the plates 76 to swing and force downwardly the rod 74 connected to the knotter frames 67 and with it the knotter frames 67. The downward movement of the knotter frames, of course, brings the similar downward movement of the strand-holding means comprising the notched plates 88 and the member 92, the bill-hook 94, and the knife 104. The lowering of these parts toward the baling chamber is important, because the bill-hook 94 in forming the bight 120 as part of the tie takes up a considerable length of strand which extends outwardly from the bale to the grasping and tying means. Lowering of the tying parts towards the mass being tied simultaneously with the knot tying operation compensates for the portions of the strands taken up in the tying operation and makes available sufficient length of strand to provide the material of the knot. Thus undue tension on the strands or breaking thereof, which would be caused by the taking up of the strands without slack providing movement of the knot-tying mechanism, is avoided. It is very desirable that a uniform tension be maintained on the strands throughout the tying operation, and a lowering of the tying parts will bring this about.

In a broader sense, the tying parts have a movement with respect to the baling chamber during the tying operation.

During the knot-tying operation, the needles 54 will have withdrawn to the position of Figure 5 in which they are below the baling chamber. When the shaft 35 has completed one revolution, a cam 122 secured thereto and engaging a follower 123 on a plate 124 pivotally mounted at 124ª on the casting 48 and pivotally connected by a bolt 125 to the upper end of the link 39 in a slot 126 thereof, will have presented a high portion 127 to the follower 123 and will thus have brought the plate 124 to the dotted-line position of Figure 6. This causes the projection 40 upon the link 38 to be disengaged from the pin 41 on the strap 42 so that the end portion 46 of the rod 43 may become reengaged with the part 47, whereby the clutch 36 is disengaged and the shaft 35 is no longer rotated. A low portion 128 on the cam 122 immediately adjacent the high spot 127 permits return of the link 39 to the full line position of Figure 6, in which the projection 40 reengages the pin 41. Thus the various parts of the tying mechanism are stopped until sufficient material has again accumulated in the baling chamber for the toothed wheel 37 to have reached the previously described predetermined position for again conditioning the clutch 36 for engagement.

It has been stated that there is novelty in the bringing of the various parts of the tying mechanism toward the baling chamber during the knot-tying or knot-forming operation so that proper slack may be provided in the strand being tied. Such shifting of the parts is, of course, of special value with a tier like that shown which ties by forming a bight and introducing another part of the strand into the bight, since a fair amount of length of strand is required. It should be obvious that the arrangement for shifting the tying mechanism may also be applied to other types of tying mechanisms. The arrangement is particularly applicable to a baler, because a bale is relatively uncompressible and will not easily provide for taking up of the strand for tying, in contrast with a bundle of grain which is loose and yieldable. The drawings illustrate the tier is applied to a traveling pick-up baler having a feed opening in a vertical side of the baling chamber. The invention is applicable to various types of balers regardless of whether they are of the traveling type and have a feed opening in a vertical side of the baling chamber. Moreover, the invention is not to be considered as limited to a tier for bales, because obviously it may be just as well applied to tying for other purposes.

It is also believed to be novel to mount the tying mechanism for lowering during the tying operation upon the top of a baling chamber. This will have special use with a baler in which material is fed by a transverse conveyor into the baling chamber through a feed opening in a vertical side thereof.

In the claims and in the specification the term "strand" has been used, and it is intended that it describe broadly all forms of tying material, such as cord, string, wire, rope, bands, etc.

The intention is to limit the invention only within the scope of the appended claims.

What is claimed is:

1. In combination, supporting means, means forming a baling chamber associated with said supporting means, a plunger mounted for reciprocation in the baling chamber, means for grasping portions of the ends of a strand extending around a bale in the baling chamber in the form of a loop, a bill-hook formed of two relatively movable parts and being operative to rotate to form a bight in the ends of the strand inwardly of the grasped portions thereof, to spread the parts to receive portions of the ends of the strand, and to close the parts to retain the last-mentioned portions, a tie being subsequently formed by sliding of the bight off the bill-hook and retaining of the portions between the parts of the bill-hook, means mounting the grasping means and the bill-hook on the supporting means for joint movement toward and away from the baling chamber, and means for moving the grasping means and the bill-hook toward the baling chamber during rotating of the bill-hook.

2. In combination, means forming a baling chamber having a top, a bottom, and vertical sides, a plunger mounted for reciprocation in the baling chamber, means above the top of the baling chamber for grasping portions of the ends of a strand extending in the form of a loop along the top and bottom and between the top and bottom of the baling chamber around a bale therein, means above the top of the baling chamber for forming a tie in the ends of the strand between the grasped portions thereof and the bale, means mounting the grasping means and the tie-forming means for joint vertical movement toward and away from the top of the baling chamber, means for successively causing the grasping means to grasp the said portions of the ends of the strands and the tie-forming means to form the tie, and means for moving the grasping means and the tie-forming means downwardly toward the top of the baling chamber during the forming of the tie to provide uniform tension in the strand.

3. In combination, means forming a baling chamber having a top, a bottom, and vertical sides, a plunger mounted for reciprocation in the baling chamber, strand-grasping means adjacent said bill-hook operative to grasp the ends of a strand extending around a bale in said baling chamber, a bill-hook formed of two relatively movable parts mounted above the top of the baling chamber and being operative to rotate and engage the strand to form a bight in the ends of the strand inwardly of the grasped portions thereof, to spread the parts to receive portions of the ends of the strand, and to close the parts to retain the last-mentioned portions, a tie being subsequently formed by sliding of the bight off the bill-hook and retaining of the portions between the parts of the bill-hook, means mounting the grasping means and the bill-hook for conjoint vertical movement toward and away from the top of the baling chamber, and means for moving the grasping means and the bill-hook downwardly toward the baling chamber during rotating of the bill-hook.

4. In combination, means forming a baling chamber extending in a certain direction and having a top, a bottom, vertical sides, and a feed opening in one vertical side, a baling plunger mounted in the baling chamber for reciprocation in the said certain direction, means associated with the baling chamber for feeding vertically across the baling chamber from the bottom thereof to the top a baling strand extending around a mass to be baled from a grasped end at the top of the baling chamber along the top of the baling chamber, then vertically across the baling chamber, and then along the bottom thereof, means for tying the grasped end of the baling strand and the portion of the baling strand fed across the baling chamber including knot-forming means utilizing a substantial length of strand during a tying operation, means mounting the tying means for vertical movement toward and away from the top of the baling chamber, and means for causing the tying means to move vertically toward the top of the baling chamber during a tying operation of the tying means.

5. In combination, means forming a baling chamber extending in a certain direction and having a top, a bottom, vertical sides, and a feed opening in one vertical side, a baling plunger mounted in the baling chamber for reciprocation in the said certain direction, means associated with the baling chamber for feeding vertically across the baling chamber from the bottom thereof to the top a baling strand extending around a mass to be baled from a grasped end at the top of the baling chamber along the top of the baling chamber, then vertically across the baling chamber, and then along the bottom thereof, means already grasping the grasped end of the baling strand and adapted to grasp a portion of the baling strand fed across the baling chamber by the feeding means, means for forming a tie in the baling strand inwardly toward the mass to be baled from the grasped parts of the baling strand said tying means including knot-forming means utilizing a substantial length of strand during a tying operation, means mounting the tying means and the grasping means for conjoint vertical movement toward and away from the top of the baling chamber, and means for moving the grasping means and the tying means toward the top of the bale chamber during a tying operation.

6. In combination, means forming a baling chamber extending in a certain direction and having a top, a bottom, vertical sides, and a feed opening in one vertical side, a baling plunger mounted in the baling chamber for reciprocation in the said certain direction, means associated with the baling chamber for feeding vertically across the baling chamber from the bottom thereof to the top a baling strand extending around a mass to be baled from a grasped end at the top of the baling chamber along the top of the baling chamber, then vertically across the baling chamber, and then along the bottom thereof, means already grasping the grasped end of the baling strand and adapted to grasp a portion of the baling strand fed across the baling chamber by the feeding means, a bill-hook formed of two relatively movable parts and being operative to rotate to form a bight in the portions of the strand inwardly of the grasped parts thereof, to spread the parts to receive sections of the baling strand and to close the parts to retain the sections of the baling strand, a tie being subsequently formed by sliding of the bight off the bill-hook and retaining of the sections between the parts of the bill-hook, means mounting the grasping means and the bill-hook on the baling chamber for joint vertical movement toward and away therefrom, and means for moving the grasping means and the bill-hook vertically toward the baling chamber during rotating of the bill-hook.

7. In combination, means forming a baling chamber, a plunger mounted for reciprocation in the baling chamber, means for grasping portions of the ends of the baling strand extending around a bale in the baling chamber in the form of a loop, means for forming a tie in the ends of the strand inwardly of the grasped portions thereof by forming a bight in the ends of the strand, introducing portions of the ends into the bight, and severing the ends of the strand between the grasped portions and the bight, and means for moving the tying means toward the baling chamber during forming of the bight.

8. In combination, means forming a baling chamber, a plunger mounted for reciprocation in the baling chamber, means associated with the baling chamber for grasping portions of the ends of a baling strand extending around a bale in the baling chamber in the form of a loop, means for forming a tie in the ends of the strand inwardly of the grasped portions thereof by forming a bight in the ends of the strand and introducing portions of the ends into the bight, and means for bodily moving the tying means toward the baling chamber during forming of the bight to provide additional length of strand required for the tying operation.

9. In combination, means forming a baling chamber having a top, a bottom, and vertical sides, a plunger mounted for reciprocation in the baling chamber, means above the baling chamber and associated therewith for grasping portions of the ends of a baling strand extending around a bale in the baling chamber in the form of a loop, means above the baling chamber for forming a tie in the ends of the strand inwardly of the grasped portions thereof by forming a bight in the ends of the strand, introducing portions of the ends into the bight, and severing the ends of the strand between the grasped portions and the bight, and means for moving the tying means downwardly toward the baling chamber during forming of the bight.

10. In combination, means forming a baling chamber extending in a certain direction and having a top, a bottom, vertical sides, and a feed opening in one vertical side, a baling plunger mounted in the baling chamber for reciprocation in the said certain direction, means associated with the baling chamber for feeding vertically across the baling chamber from the bottom thereof to the top a baling strand extending around a mass to be baled from a grasped end at the top of the baling chamber along the top of the baling chamber, then vertically across the baling chamber, and then along the bottom thereof, means already grasping the grasped end of the baling strand and adapted to grasp a portion of the baling strand fed across the baling chamber by the feeding means, means above the baling chamber and associated therewith for tying the baling strand inwardly of the grasped portions by forming a bight in the strand, introducing parts of the strand into the bight, and severing the strand at a point between the bight and the grasped portions, and means for downwardly moving the tying means toward the baling chamber during forming of the bight.

11. In combination, means forming a baling chamber extending in a certain direction and having top, bottom, vertical sides, and a feed opening in one vertical side, a plunger mounted in the baling chamber for reciprocation in the said certain direction, tying means positioned above the top of the baling chamber for tying the ends of a strand extending along the top and bottom of the baling chamber in the said certain direction and vertically between the top and the bottom of the baling chamber around a bale in the form of a loop, means mounting the tying means for vertical movement toward and away from the top of the baling chamber, and means for causing the tying means to move downwardly toward the top of the baling chamber during a tying operation of the tying means.

12. In combination, means forming a baling chamber, a plunger mounted for reciprocation in the baling chamber, a knotter frame pivotally mounted for substantially vertical movement on said baling chamber, means on said frame for grasping portions of the ends of a strand extending around a bale in the baling chamber in the form of a loop, means on the frame for forming a tie in the ends of the strand between the grasped portions thereof and the bale, means for moving the frame with the grasping means and the tie-forming means bodily toward and away from the bale, means for successively causing the grasping means to grasp the said portions of the ends of the strands and the tie-forming means to form the tie, and means for moving the frame toward the bale during the forming of the tie to provide substantially uniform tension in the strand during the tying operation.

13. In combination, means forming a baling chamber extending in a certain direction and having a top, a bottom, vertical sides, and a feed opening in one vertical side, a baling plunger mounted in the baling chamber for reciprocation in the said certain direction, means for feeding vertically across the baling chamber from the bottom thereof to the top a baling strand extending around a mass to be baled from a grasped end at the top of the baling chamber along the top of the baling chamber, then vertically across the baling chamber, and then along the bottom thereof, means mounting the feeding means on the baling chamber, a knotter frame pivotally mounted at the top of the baling chamber for movement towards and away therefrom, means on said frame already grasping the grasped end of the baling strand and adapted to grasp a portion of the baling strand fed across the baling chamber by the feeding means, means on said frame including a rotatable knotter hook for tying the baling strand inwardly of the grasped parts thereof by forming a bight inwardly of the grasped portions, introducing into the bight portions of the baling strand between the grasped portions and the bight, and severing at a point between the grasped portions and the bight, and means for moving downwardly the knotter frame and the tying means carried thereby toward the baling chamber during forming of the bight.

14. In combination, supporting means, a holder for a mass to be tied associated with said supporting means, knot-tying means including strand-holding and knot-forming means which uses a substantial length of strand for tying the ends of a strand extending around the mass in the form of a loop and outwardly from the mass to the tying means, means mounting the tying means on the supporting means for movement toward and away from the holder, and means for bodily moving the tying means toward the holder simultaneously with a tying operation thereby making available additional length of strand.

15. In combination, supporting means, a holder for a mass to be tied associated with said supporting means, means for tying the ends of a strand extending around the mass and outwardly therefrom including means for forming a bight in the ends of the strand and introducing portions of the ends into the bight, said tying operation using a substantial length of strand, means mounting the tying means on the supporting means for bodily movement toward and away from the holder, and means for moving the tying means toward the holder during forming of the bight by the tying means thereby making available additional length of strand.

16. In combination, means forming a baling chamber, a plunger mounted for reciprocation in the baling chamber, tying means for tying a knot at the ends of a strand extending around a bale in the baling chamber in the form of a loop and extending therefrom to the tying means said means utilizing a predetermined length of the strand in the tying operation, means mounting the tying means on the baling chamber for movement towards and away from the baling chamber, and means for bodily moving the tying means towards the baling chamber simultaneously with a knot-tying operation of the tying means to make available additional length of strand while maintaining substantially the same tension in the strand.

17. In combination, means forming a baling chamber, a plunger mounted for reciprocation in the baling chamber, means for grasping portions of the ends of a strand extending around a bale in the baling chamber in the form of a loop and outwardly therefrom to the tying means, means for forming a tie in the ends of the strand between the grasped portions thereof and the bale said means utilizing a substantial length of strand during the tying operation, means mounting the grasping means and the tie-forming means on the baling chamber for joint movement with respect to the bale, means for successively causing the grasping means to grasp the said portions of the ends of the strands and the tie-forming means to form the tie, and means for moving the grasping means and the tie-forming means towards the bale during the forming of the tie to make available an additional length of strand required to form the tie and to thereby maintain substantially uniform tension in the strand during the tying operation.

18. In combination, means forming a baling chamber having a top, a bottom, and vertical sides, a plunger mounted for reciprocation in the baling chamber, tying means positioned for tying the ends of a strand extending in the form of a loop from the tying means along the top and bottom and between the top and bottom of the baling chamber around a bale therein, said tying means including knot-forming means utilizing a substantial length of strand during a tying operation, means mounting the tying means above the baling chamber for vertical movement toward and away from the top of the baling chamber, and means for bodily moving the tying means downwardly toward the top of the baling chamber simultaneously with a tying operation of the tying means thereby making available additional length of strand for the knot-forming operation.

CHARLES F. CRUMB.